(12) United States Patent
Huang

(10) Patent No.: US 8,014,482 B2
(45) Date of Patent: Sep. 6, 2011

(54) SIGNAL RECEIVING CIRCUIT UTILIZING TIMING RECOVERY PARAMETER GENERATING CIRCUIT

(75) Inventor: Kai Huang, Chi-Lung (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 867 days.

(21) Appl. No.: 11/944,638

(22) Filed: Nov. 26, 2007

(65) Prior Publication Data

US 2009/0135894 A1  May 28, 2009

(51) Int. Cl.
*H04L 7/00* (2006.01)
(52) U.S. Cl. ...................................................... 375/355
(58) Field of Classification Search .................. 375/355, 375/232, 348, 350, 341, 353, 360, 316, 322, 375/324, 325, 326, 345, 229, 354, 346; 386/124; 341/200, 126
See application file for complete search history.

(56) References Cited

U.S. PATENT DOCUMENTS

| | | | |
|---|---|---|---|
| 4,669,092 A | 5/1987 | Sari | |
| 6,429,986 B1 | 8/2002 | Blaum | |
| 7,079,574 B2 * | 7/2006 | Rafie et al. | 375/232 |
| 7,424,077 B2 * | 9/2008 | Yang et al. | 375/360 |
| 7,428,282 B2 * | 9/2008 | Sommer | 375/353 |
| 7,564,931 B2 * | 7/2009 | Venkataramani et al. | 375/341 |
| 7,720,139 B2 * | 5/2010 | Jibry | 375/232 |
| 7,756,228 B1 * | 7/2010 | Manickam et al. | 375/350 |
| 2002/0126749 A1 * | 9/2002 | Galbraith et al. | 375/229 |
| 2003/0215036 A1 | 11/2003 | Ma | |
| 2005/0185742 A1 * | 8/2005 | Liu | 375/348 |
| 2006/0002689 A1 * | 1/2006 | Yang et al. | 386/124 |
| 2007/0071152 A1 * | 3/2007 | Chen et al. | 375/355 |
| 2008/0080606 A1 * | 4/2008 | Wang et al. | 375/232 |

FOREIGN PATENT DOCUMENTS

TW  563318  11/2003

* cited by examiner

*Primary Examiner* — David C. Payne
*Assistant Examiner* — Vineeta Panwalkar
(74) *Attorney, Agent, or Firm* — Winston Hsu; Scott Margo

(57) ABSTRACT

A signal receiving circuit includes: a sampler, for receiving an analog signal and sampling the analog signal according to a sampling clock to generate a sampling signal; an ADC, coupled to the sampler, for converting the sampling signal to a digital signal; an equalizer, coupled to the ADC, for equalizing the digital signal to generate an equalized digital signal; a quantizer, coupled to the equalizer for quantizing the equalized digital signal to generate a processed digital signal; and a timing recovery circuit, directly connected to the output terminal of the sampler and coupled to the quantizer, for adjusting the timing of the sampling clock according to the processed digital signal and the digital signal. Timing recovery parameter generating circuits are also disclosed.

5 Claims, 14 Drawing Sheets

| Transmission line length (M) | Selected candidate value | $K_{cable}$ value |
|---|---|---|
| 0 | 1 | 4 |
| 50 | 2 | 10 |
| 80 | 3 | 10 |
| 100 | 4 | 10 |
| Over 120 | 5 | 12 |

FIG. 10

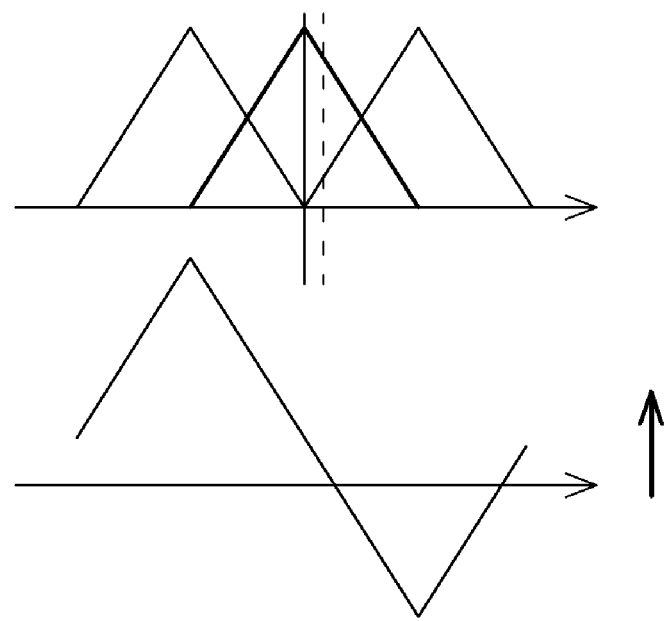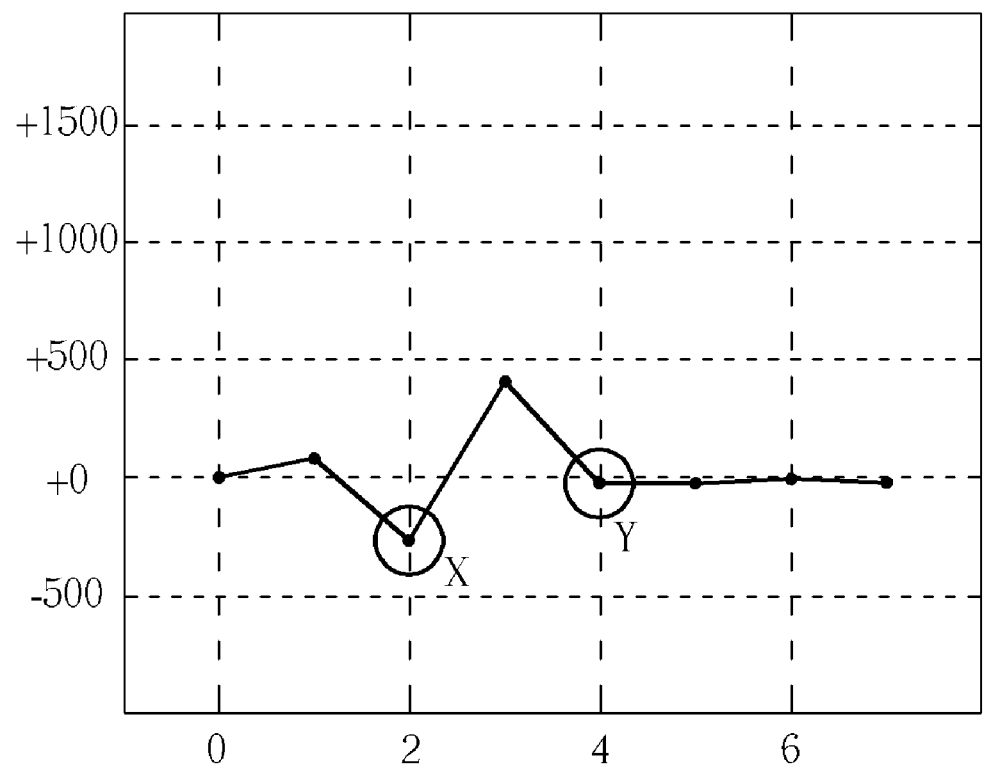
FIG. 13

SIGNAL RECEIVING CIRCUIT UTILIZING TIMING RECOVERY PARAMETER GENERATING CIRCUIT

BACKGROUND OF THE INVENTION

1. Field of the Invention

The present invention relates to a signal receiving circuit utilizing a timing recovery parameter generating circuit, and particularly relates to a signal receiving circuit utilizing a timing recovery parameter generating circuit that utilizes a Mueller & Muller algorithm.

2. Description of the Prior Art

In general, signal processing circuits include a timing recovery circuit for amending sample phases of a sampler to obtain correct signals. FIG. 1 illustrates a prior art signal receiving circuit 100. The signal receiving circuit 100 includes a sampler 101, an analog digital converter (ADC) 103, a digital signal processor 105 and a timing recovery circuit 107. The digital signal processor 105 includes an equalizer 109 and a quantizer 111, and the timing recovery circuit 107 includes a timing recovery parameter generating circuit 113, a loop filter 115 and a voltage controlled oscillator (VCO) 117. The sampler 101 is used for sampling an analog signal AS to generate a sampled signal SS, and the ADC 103 is used for transferring the sampled signal SS to a digital signal DS. The digital signal DS is processed by the equalizer 109 and the quantizer 111 to form a processed digital signal PDS. The timing recovery parameter generating circuit 113 generates a timing recovery parameter TP according to an equalized digital signal EDS and the processed digital signal PDS, then the loop filter 115 and the VCO 117 adjust the sampling clock signal SCLK according to the timing recovery parameter TP.

In this system, the signal at the receiving terminal can be shown as $$x(t) = \sum_k a_k h(t - kT) + n(t),$$

wherein n(t) is White Gaussian Noise, and T is the period. If the sample timing of a $m_{th}$ symbol is supposed to be $\tau+MT$, than the sampled symbol can be shown as $$x(\tau + mT) = h(\tau)\left[a_m + \frac{1}{h(\tau)}\sum_{i=-\infty}^{\infty} a_{m-i}h(\tau + iT) + \frac{n(\tau + mT)}{h(\tau)}\right],$$

wherein $$\frac{1}{h(\tau)}\sum_{i=-\infty}^{\infty} a_{m-i}h(\tau + iT)$$

indicates noise, and the timing recovery circuit 107 is used for enabling the sampler 101 to sample at a suitable phase for making the SNR ratio as high as possible.

FIG. 2 illustrates an impulse response with ISI situation. FIG. 3 is a schematic diagram illustrating how the prior art utilizes impulse response to find sampling points. The impulse response is indicated as h(t), and the impulse response at the receiver is the sum of the filter at the transmitting terminal, and the filter and channel at a receiving terminal. As shown in FIG. 2, the symbol $h_0$ is the impulse response of a current signal, and $h_1$, $h_{-1}$ are, respectively, impulse responses of signals of a previous period and a next period. Conventionally, there will be ISI (Inter-Symbol Interference) between $h_0$, $h_1$, and $h_{-1}$, and the impulse response shown in FIG. 2 includes serious ISI. ISI is an important reference for the timing recovery circuit 107, however. Normally, a timing function $$f(\tau) = \frac{1}{2}(h(\tau + T) - h(\tau - T)) = \frac{1}{2}(h_1 - h_{-1})$$

is utilized for computing a best sampling point, as shown in FIG. 3. In FIG. 3, a zero-crossing point x is a middle point of a current symbol $h_0$, and is theoretically a best sampling point. Also, the timing function can be computed from the Mueller & Muller algorithm.

FIG. 4 is a circuit diagram of a prior art Mueller and Muller algorithm. As shown in FIG. 4, the timing recovery parameter generating circuit 113 is a circuit utilizing a Mueller and Muller algorithm, and generates a timing adjusting parameter TP for following processing devices. Relevant details of the Mueller and Muller algorithm are disclosed in K. H. Mueller and M. Muller, *"Timing Recovery in Digital Synchronous Data Receivers,"* IEEE Trans. Communications, vol. Com-24, pp. 516-531, May 1976.

As described above, the Mueller & Muller algorithm can be utilized to get correct sampling points via ISI. However, the equalizer 109 shown in FIG. 1 may eliminate ISI, such that the determination of the sampling points may fail. As shown in FIG. 5, there will be no ISI between h0, h1, and h−1 after processing of the equalizer 109. Such symbol will have a region Y at a location at which the zero crossing point is supposed to exist after being processed by the timing function. In this case, a new sampling point may locate at any point in the Y region and the zero crossing point may shift, such that the sampling point will be incorrectly selected and the timing recovery circuit 107 may break. Moreover, in this structure, the closed loop includes an equalizer, which may diverge.

Additionally, since the impulse response of channels is asymmetric, the asymmetry will get more serious if the transmission line for transmitting signals is increased. FIG. 6 is a schematic diagram illustrating how to utilize the impulse response of FIG. 5 to find sampling points. As shown in FIG. 6, the symbol h is not as perfect as h0, h1, h−1 shown in FIGS. 3 and 5 but has an extended region Z, which will disturb the selecting of correct sampling points. The longer the line, the more accurate the zero point, i.e. the sampling point will reach the next signal. Since the resistance of the equalizer for the previous signal interference is larger than that for the next signal interference, such a situation is best avoided.

Therefore, a new invention is needed to solve the above-mentioned problems.

SUMMARY OF THE INVENTION

Therefore, one objective of the present invention is to provide a signal receiving circuit, which refers to a signal that is not processed via the equalizer in order to compute correct sampling points.

Another objective of the present invention is to provide a timing recovery parameter generating circuit, which can correct errors due to lengths of the transmission line.

Another objective of the present invention is to provide a timing recovery parameter generating circuit, which can adjust sampling points according to weight of impulse response.

An embodiment of the present invention discloses a signal receiving circuit, which comprises: a sampler, for receiving an analog signal and for sampling the analog signal to generate a sampling signal according to a sampling clock; an ADC, coupled to the sampler, for transferring the sampling signal to a digital signal; an equalizer, coupled to the ADC, for equalizing the digital signal to generate an equalized digital signal; a quantizer, coupled to the equalizer, for quantizing the equalized digital signal to generate a processed digital signal; and a timing recovery circuit, directly coupled to an output terminal of the sampler and coupled to the equalizer, for adjusting timing of the sampling clock according to the processed digital signal and the digital signal.

Another embodiment of the present invention discloses a timing recovery parameter generating circuit for estimating timing error of a sampling clock to generate a target timing recovery parameter, which comprises: a digital signal processing circuit, for receiving a digital signal to generate a processed digital signal; a computing circuit, coupled to the digital signal processing circuit, for receiving the processed digital signal and the digital signal, and for computing an initial timing recovery parameter according to the processed digital signal and the digital signal; a candidate value generating circuit, for providing a plurality of candidate values; and a multiplexer, coupled between the computing circuit and the candidate value generating circuit, for selecting one of the candidate values as an adjusting value according to a selecting signal; wherein the computing circuit further generates the target timing recovery parameter according to the adjusting value and the initial timing recovery parameter.

Another embodiment of the present invention discloses a timing recovery parameter generating circuit, for estimating timing error of a sampling clock to generate a target timing recovery parameter, which comprises: a digital signal processing circuit, for receiving a digital signal to generate a processed digital signal; a computing circuit, coupled to the digital signal processing circuit, for receiving the processed digital signal and the digital signal, and for computing an initial timing recovery parameter according to the processed digital signal and the digital signal; and an adjusting value generating circuit, coupled to the computing circuit, for generating an adjusting value according to a first weight value and a second weight value of a previous signal and a next signal of the digital signal; wherein the computing circuit adjusts the initial timing recovery parameter to generate the target timing recovery parameter according to the adjusting value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 is a table of the timing recovery parameter generating circuit shown in FIG. 9.

FIGS. 11~13 are schematic diagrams illustrating the relations between sampling points and weight values.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
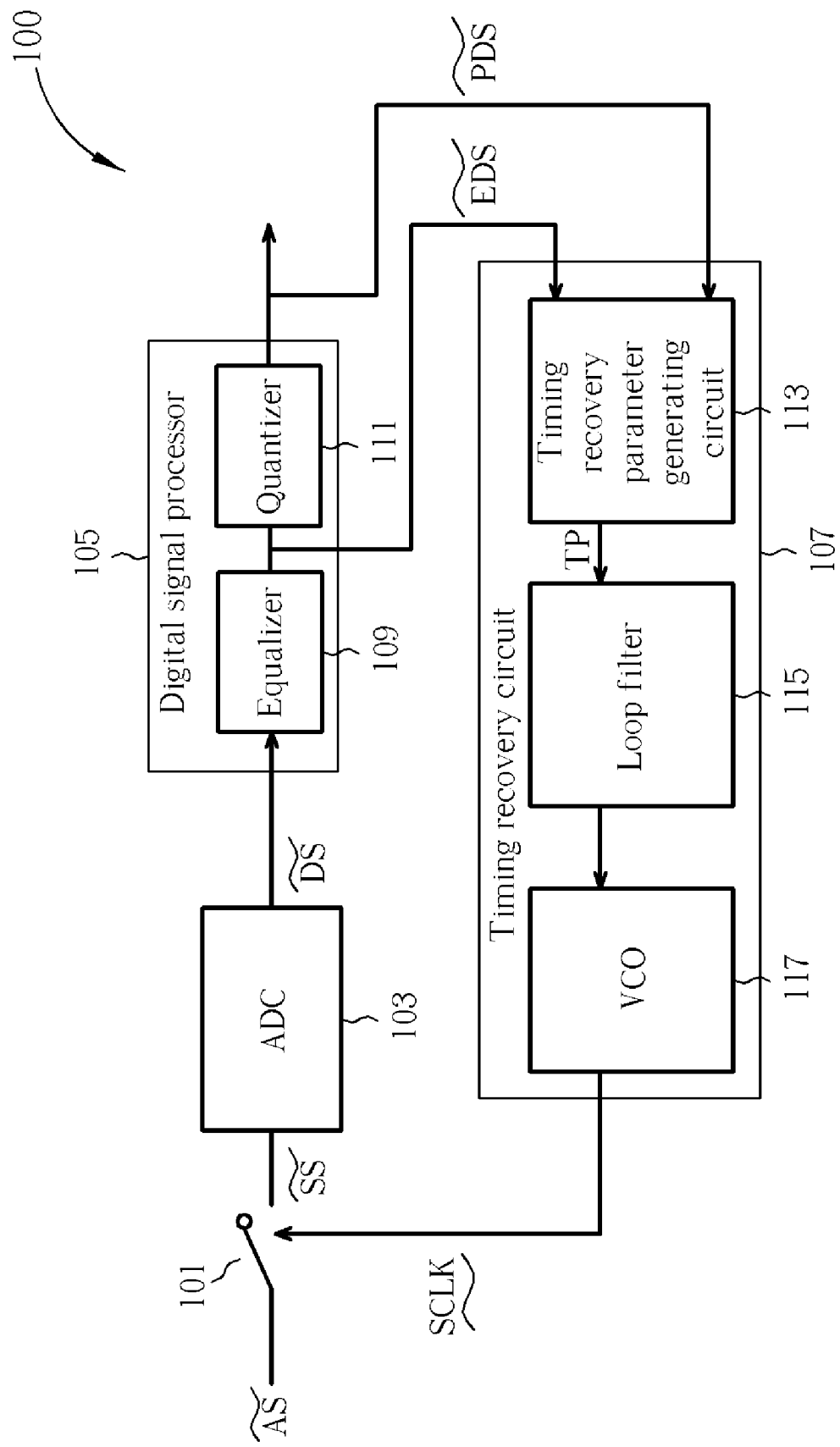
FIG. 1 illustrates a prior art signal receiving circuit.
Figure 2:
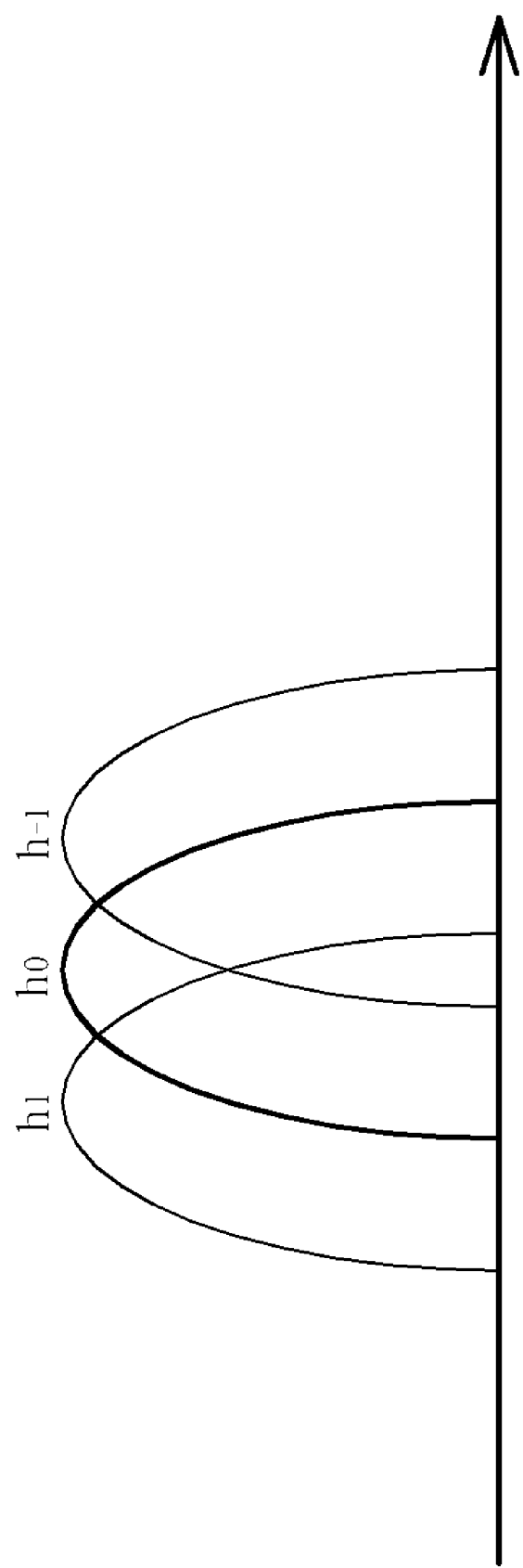
FIG. 2 illustrates an impulse response with ISI situation.
Figure 3:
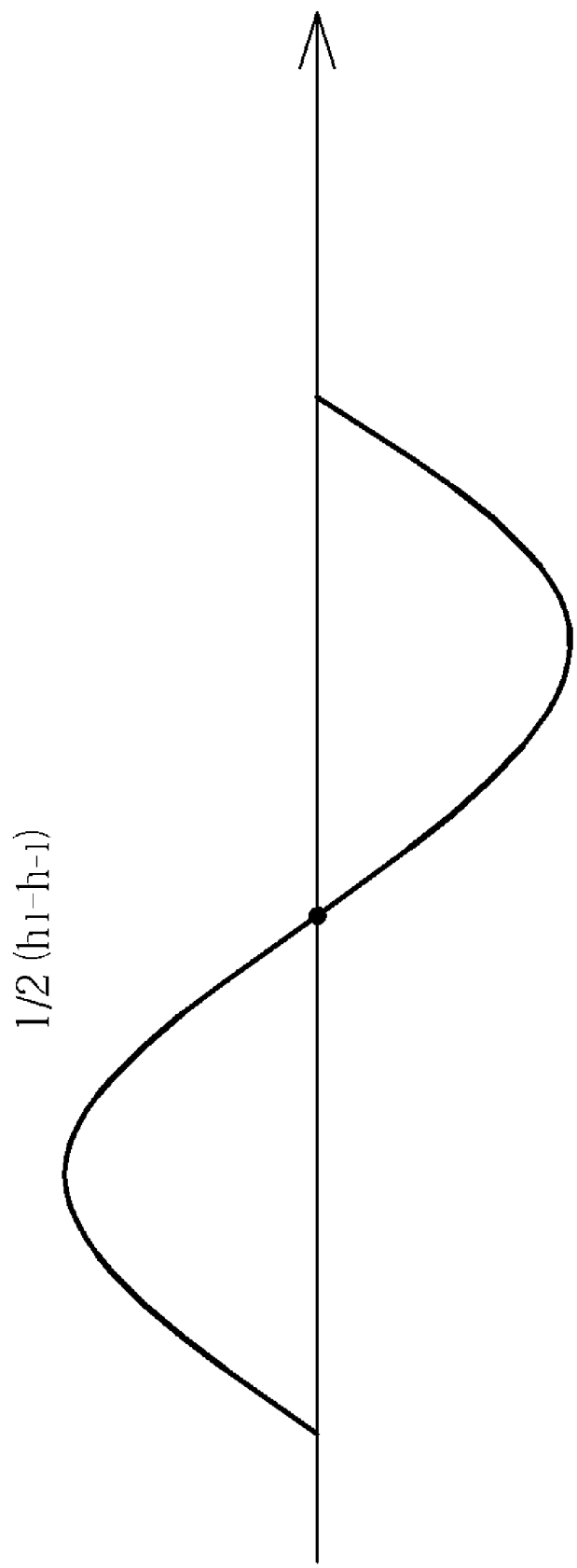
FIG. 3 is a schematic diagram illustrating how the prior art utilizes impulse response to find sampling points.
Figure 4:
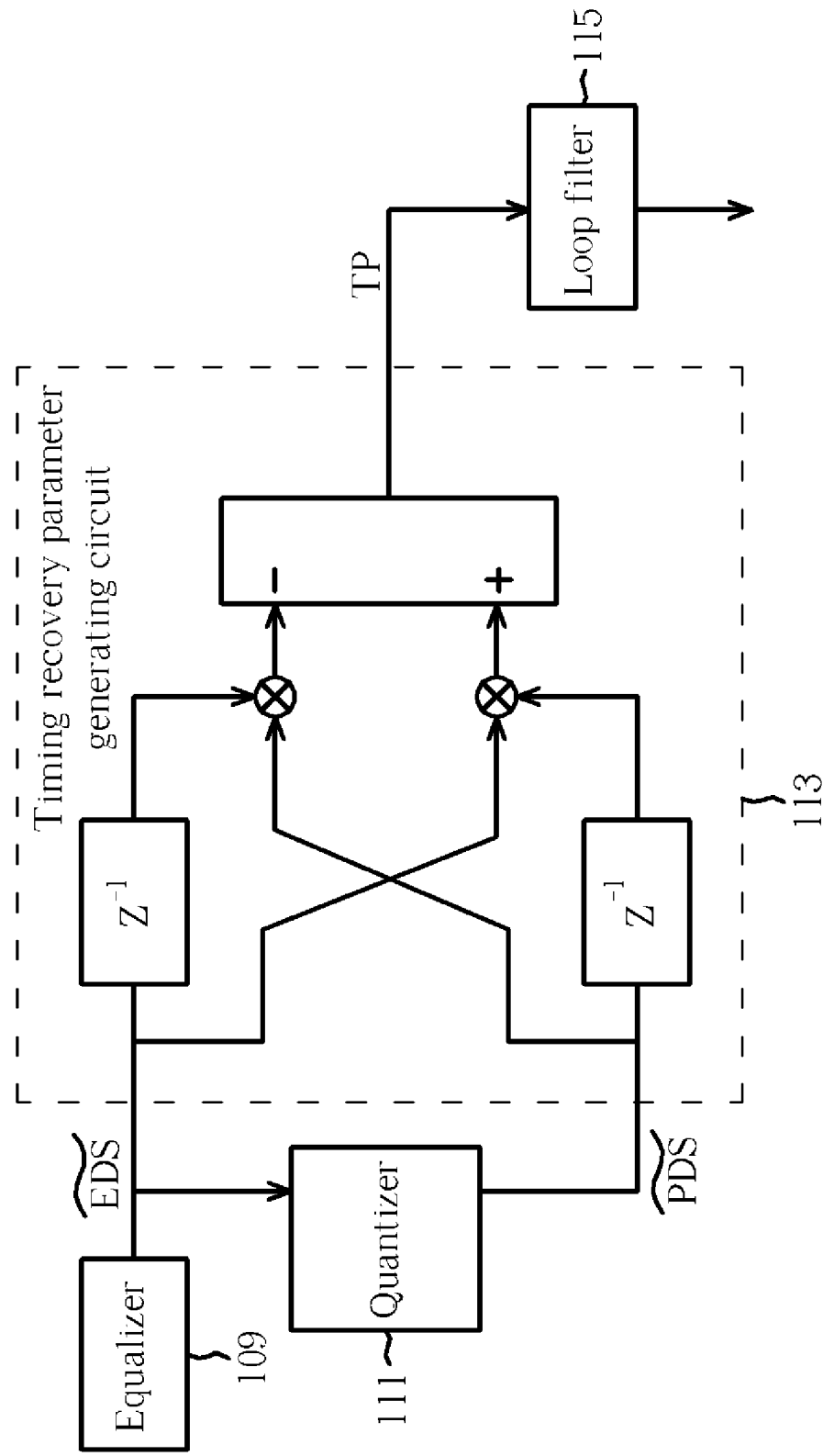
FIG. 4 is a circuit diagram of a prior art Mueller and Muller algorithm.
Figure 5:
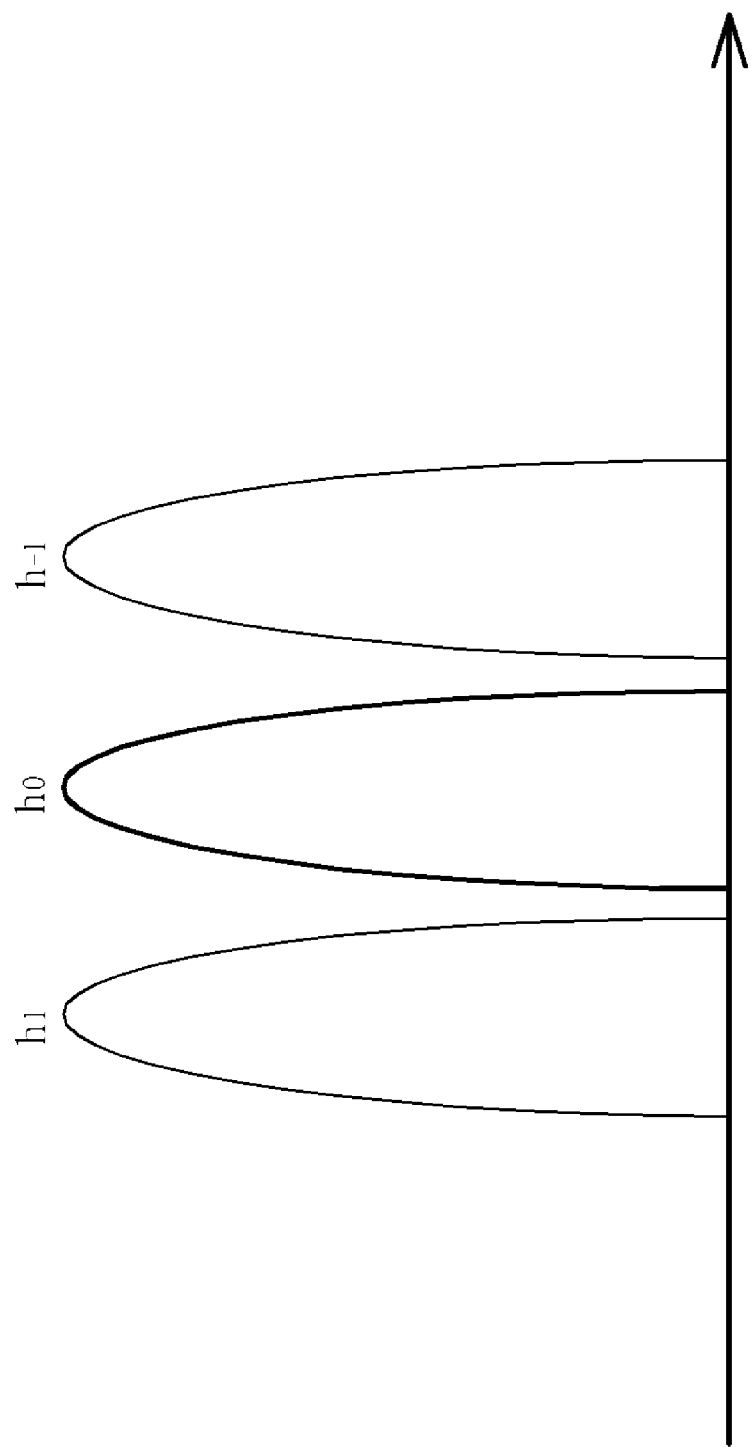
FIG. 5 illustrates an impulse response without ISI situation.
Figure 6:
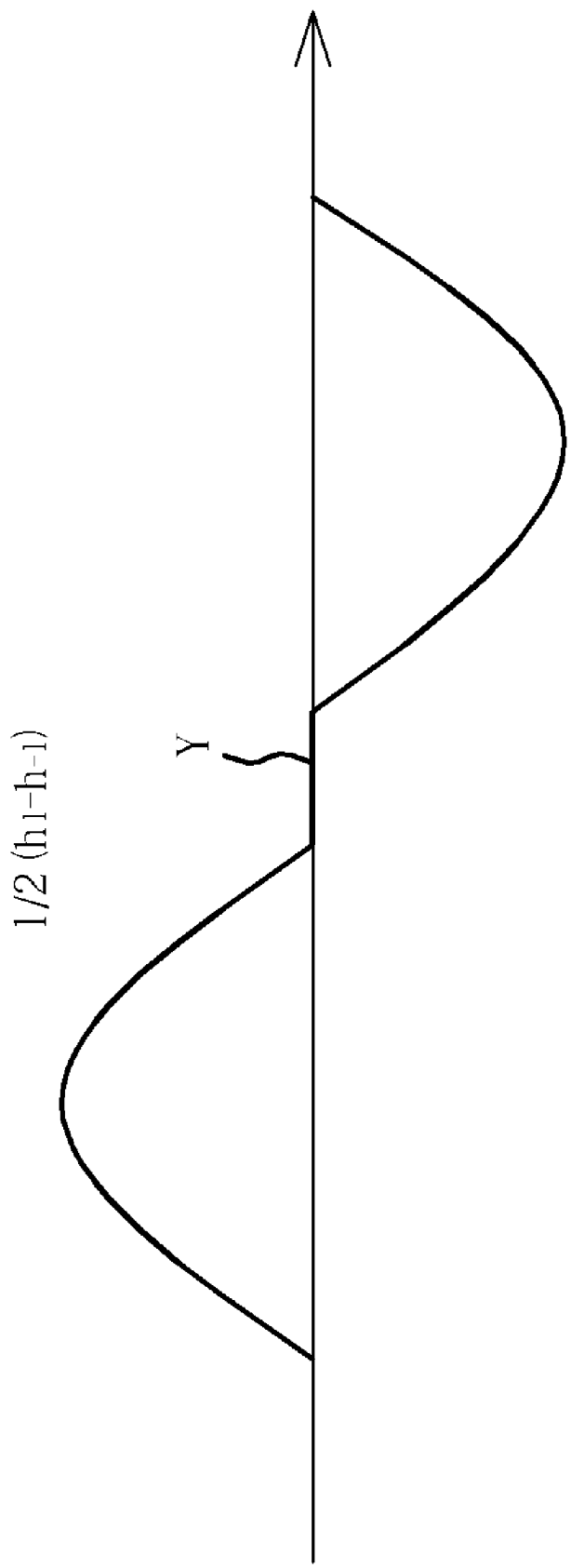
FIG. 6 is a schematic diagram illustrating how to utilize the impulse response of FIG. 5 to find sampling points.
Figure 7:
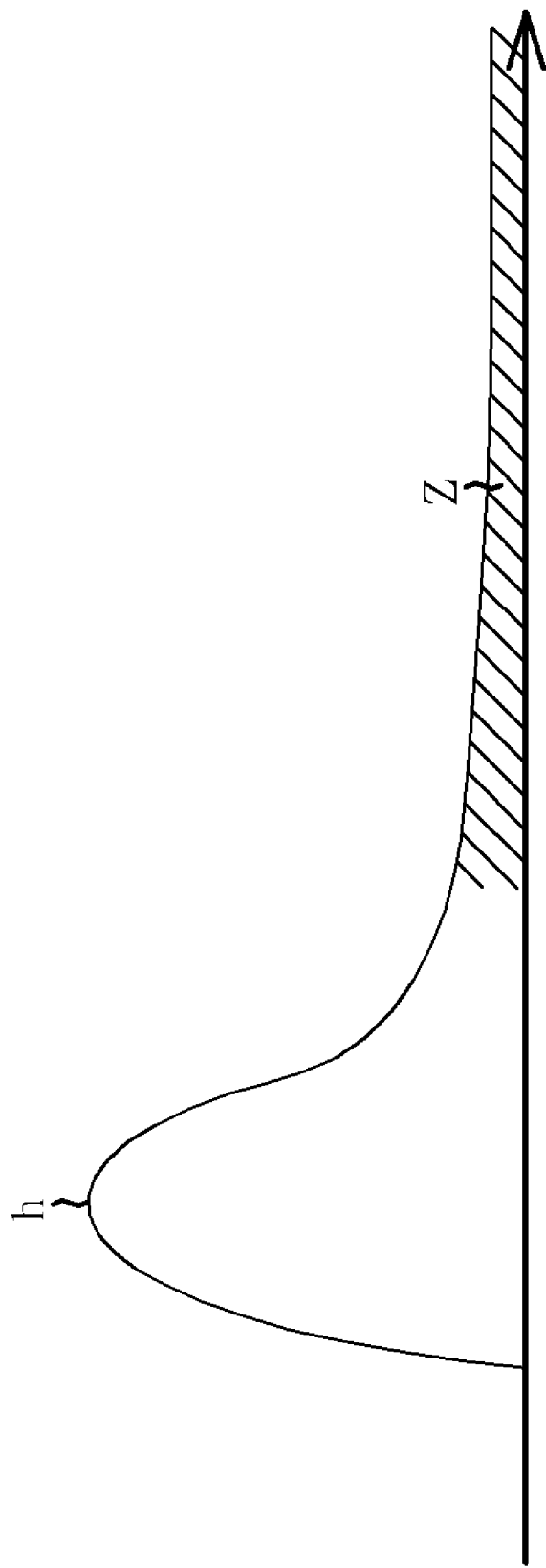
FIG. 7 is a schematic diagram illustrating an un-symmetrical impulse response due to transmission lines.
Figure 8:
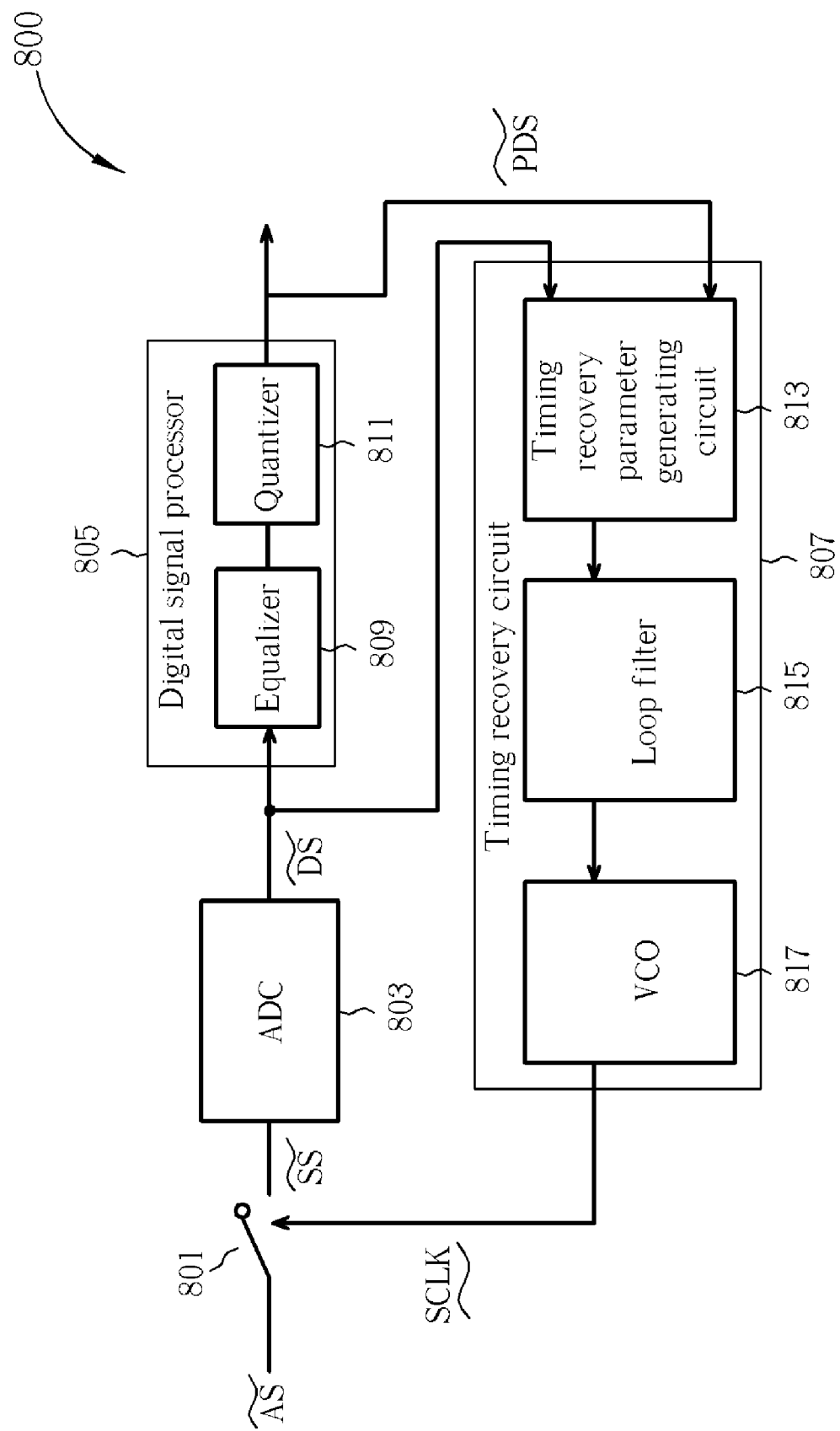
FIG. 8 is a circuit diagram illustrating a signal receiving circuit according to an embodiment of the present invention.

FIG. 8 is a circuit diagram illustrating a signal receiving circuit according to an embodiment of the present invention. The circuit is the same as the signal receiving circuit 100 shown in FIG. 1, but also includes a sampler 801, an analog to digital converter (ADC) 803, a digital signal processor 805 and a timing recovery circuit 807. The digital signal processor 805 also includes an equalizer 809 and a quantizer 811, and the timing recovery circuit 807 also includes a timing recovery parameter generating circuit 813, a loop filter 815 and a voltage control oscillator 817.

The difference between the signal receiving circuit 800 and 100 is that the timing recovery circuit 807 in the signal receiving circuit 800 is directly connected to a front end of the equalizer 809 instead of being coupled between the equalizer 809 and the quantizer 811. Therefore, the timing recovery circuit 807 does not utilize an equalized digital signal EDS processed by the equalizer 809 as a reference to adjust the clock SCLK, but utilizes a digital signal DS, which is not processed by the equalizer 809, as a reference to adjust the clock SCLK.

According to this structure, since the timing recovery circuit 807 utilizes a digital signal DS as a reference to adjust the clock SCLK, where the digital signal DS is not processed by the equalizer 809, the above-mentioned problems of sampling error due to ISI can be avoided. Also, since the closed loop does not include the equalizer, the equalizer will not diverge. Additionally, the timing recovery circuit 807 will not be damaged.

Figure 9:
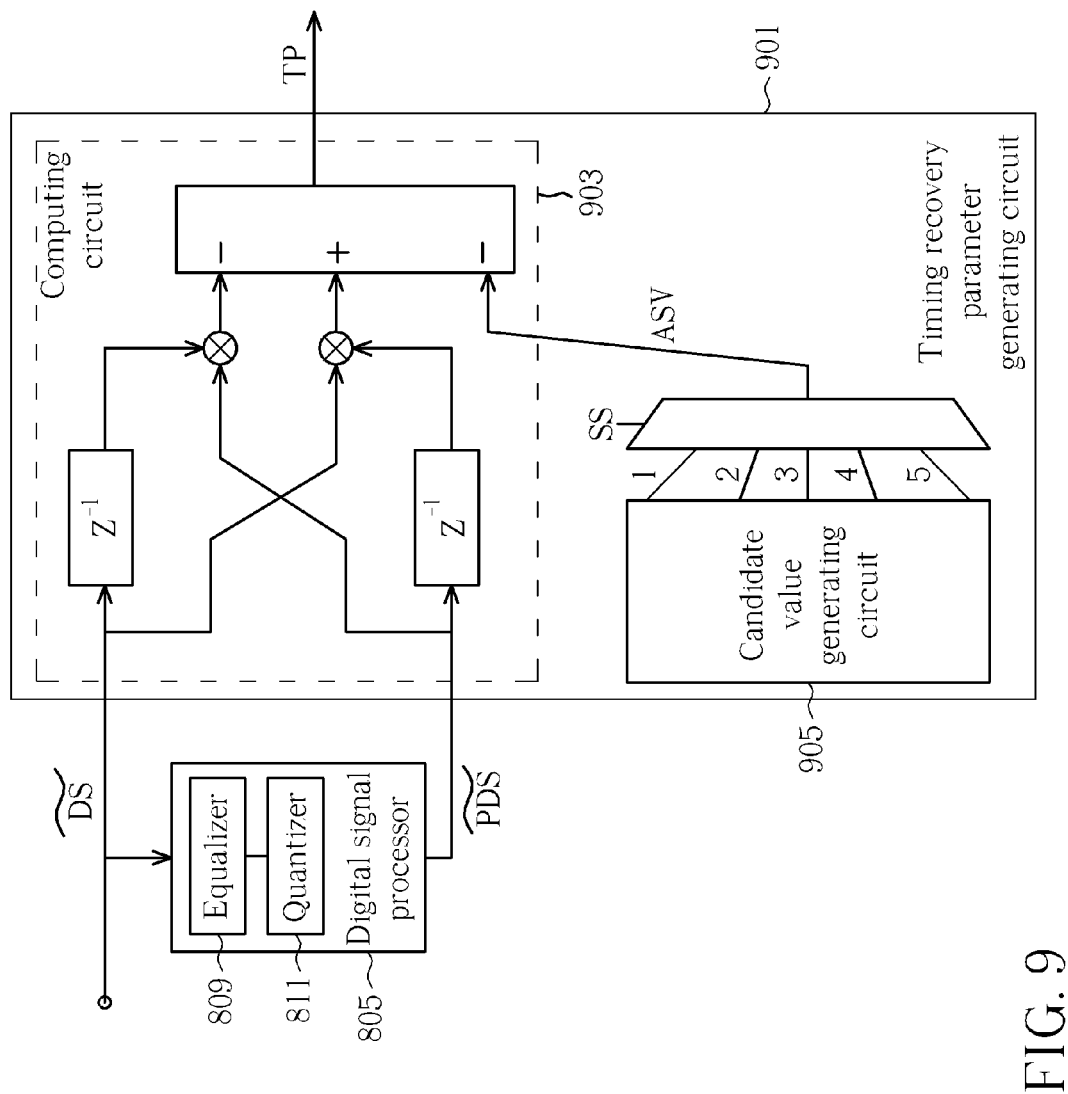
FIG. 9 is a circuit diagram illustrating a timing recovery parameter generating circuit according to a first embodiment of the present invention.

FIG. 9 is a circuit diagram illustrating a timing recovery parameter generating circuit according to a first embodiment of the present invention, which can improve the above-mentioned sampling error due to lengths of a transmission line. As shown in FIG. 9, the timing recovery parameter generating circuit 901 includes a computing circuit 903, a candidate value generating circuit 905, and a multiplexer 907. In this embodiment, the computing circuit 903 also utilizes a Mueller & Muller algorithm, which is coupled to the equalizer 809 and the quantizer 811 shown in FIG. 8, for receiving the processed digital signal PDS and the digital signal DS, and for computing an initial timing recovery parameter according to the processed digital signal PDS and the digital signal DS. The candidate value generating circuit 905 is used for providing a plurality of candidate values. The multiplexer 907, which is coupled between the computing circuit 903 and the candidate value generating circuit 905, is used for selecting one of the candidate values as an adjusting value ADV according to a selecting signal SS. The computing circuit 903 adjusts timing of the sampling clock according to the adjusting value ADV.

In this embodiment, the computing circuit 903 is coupled to the ADC 803 shown in FIG. 8 and receives a digital signal DS from the ADC 803. The signal SS is utilized as an auto gain control signal for adjusting gain of the signal receiving circuit 800, and the candidate values 1~5 are values corresponding to different transmission line lengths, but such parameters are not meant to limit the scope of the present invention. In other words, the structure of the present circuit can be replaced with different parameters according to different requirements, which also falls within the scope of the present invention. Furthermore, although the computing circuit 903 is based on a Muller and Muller algorithm, other algorithms can be utilized to compute an initial timing recovery parameter.

The computing circuit 903 subtracts an adjusting value ADV from the initial timing recovery parameter to generate a timing recovery parameter TP. Briefly, the timing recovery parameter TP is initially generated from $$f(\tau) = \frac{1}{2}(h(\tau+T) - h(\tau-T)) = \frac{1}{2}(h_1 - h_{-1}),$$

but is generated from $$f(\tau) = \frac{1}{2}(h(\tau+T) - h(\tau-T)) = \frac{1}{2}(h_1 - h_{-1}) - Kcable$$

for the timing recovery parameter generating circuit 901. As mentioned above, if the timing recovery parameter TP subtracts a positive value, then the sampling point will have a left shift.

FIG. 10 is a table of the timing recovery parameter generating circuit shown in FIG. 9. As shown in FIG. 10, when a transmission line length is 0 meters, the candidate value 1 is selected; when a transmission line length is 50 meters, the candidate value 2 is selected etc. Also, different candidate values respectively correspond to different $K_{cable}$ values. Therefore, the timing recovery parameter generating circuit 901 utilizes the selecting signal SS to select $K_{cable}$ values corresponding to different transmission line lengths, then subtracts the initial timing recovery parameter by $K_{cable}$ value to generate the timing recovery parameter TP. It should be noted that, if the $K_{cable}$ value is positive, than the sampling point will have left shift, such that the signal can avoid the effect of a next signal. As described above, however, the resistance of the equalizer for disturbance of a previous signal is higher than the resistance for disturbance of a next signal, thus the present invention utilizes positive $K_{cable}$ values for example, but this does not mean the timing recovery parameter generating circuit 901 is only suitable for positive K values.

Figure 11:
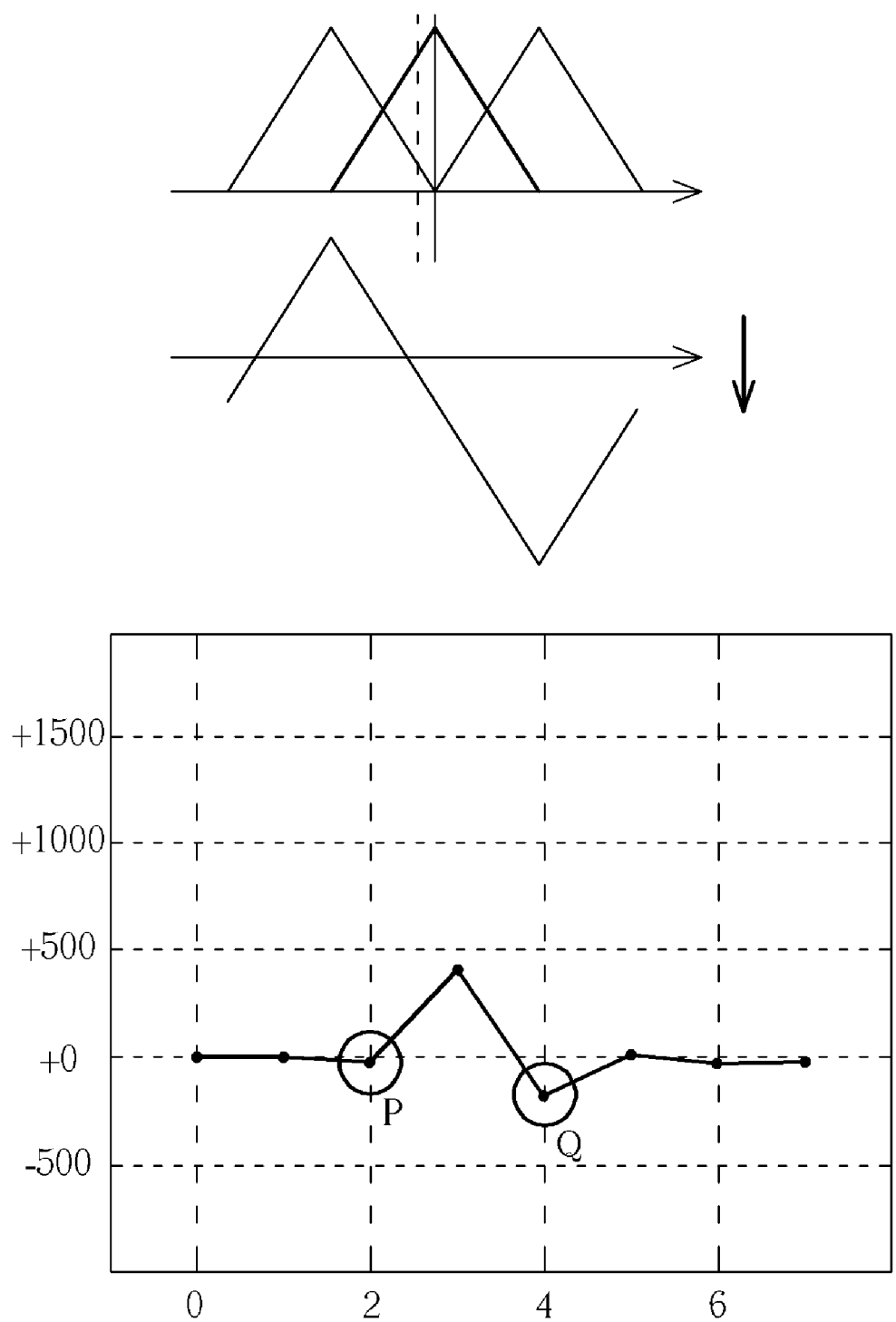
Figure 12:
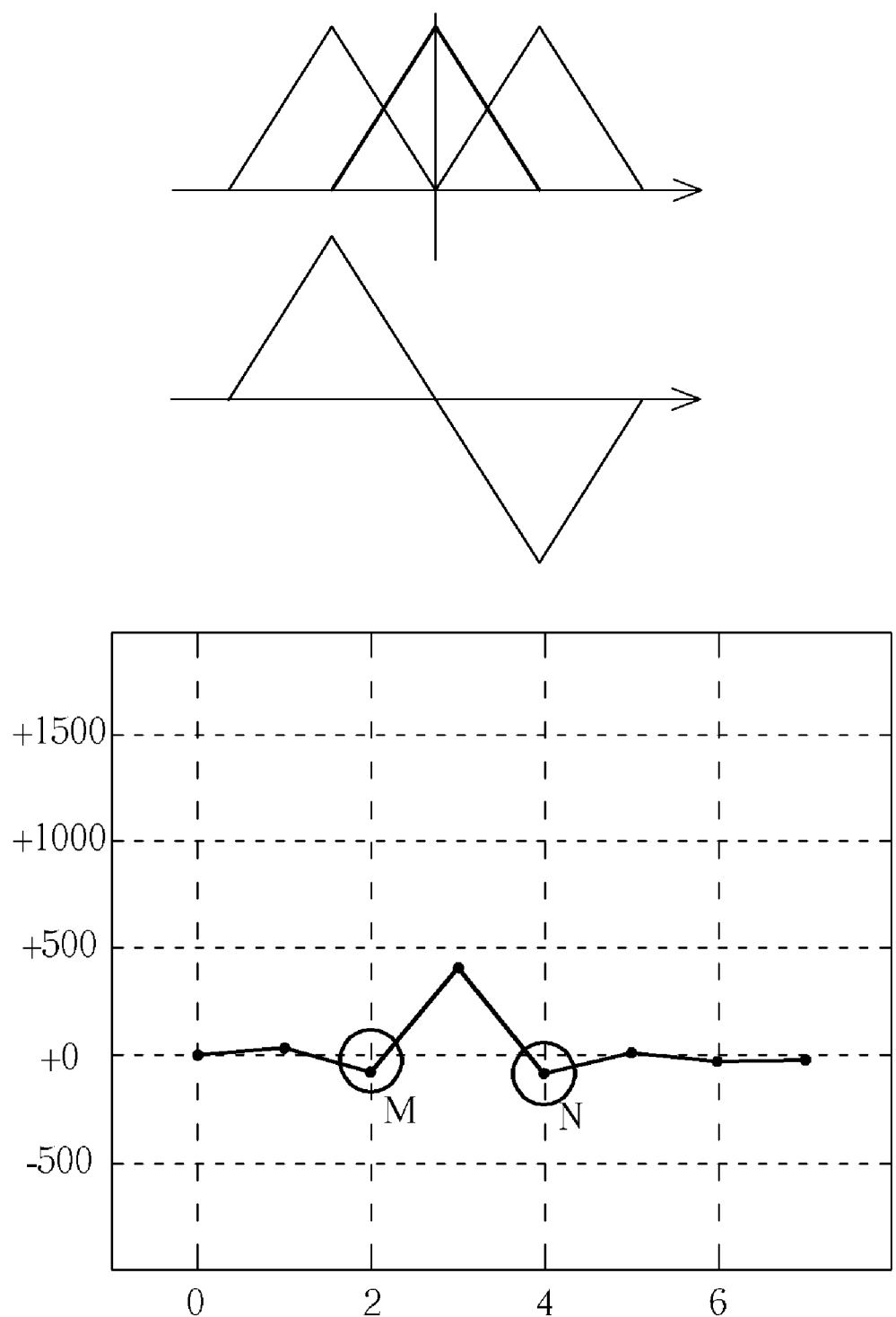
Figure 14:
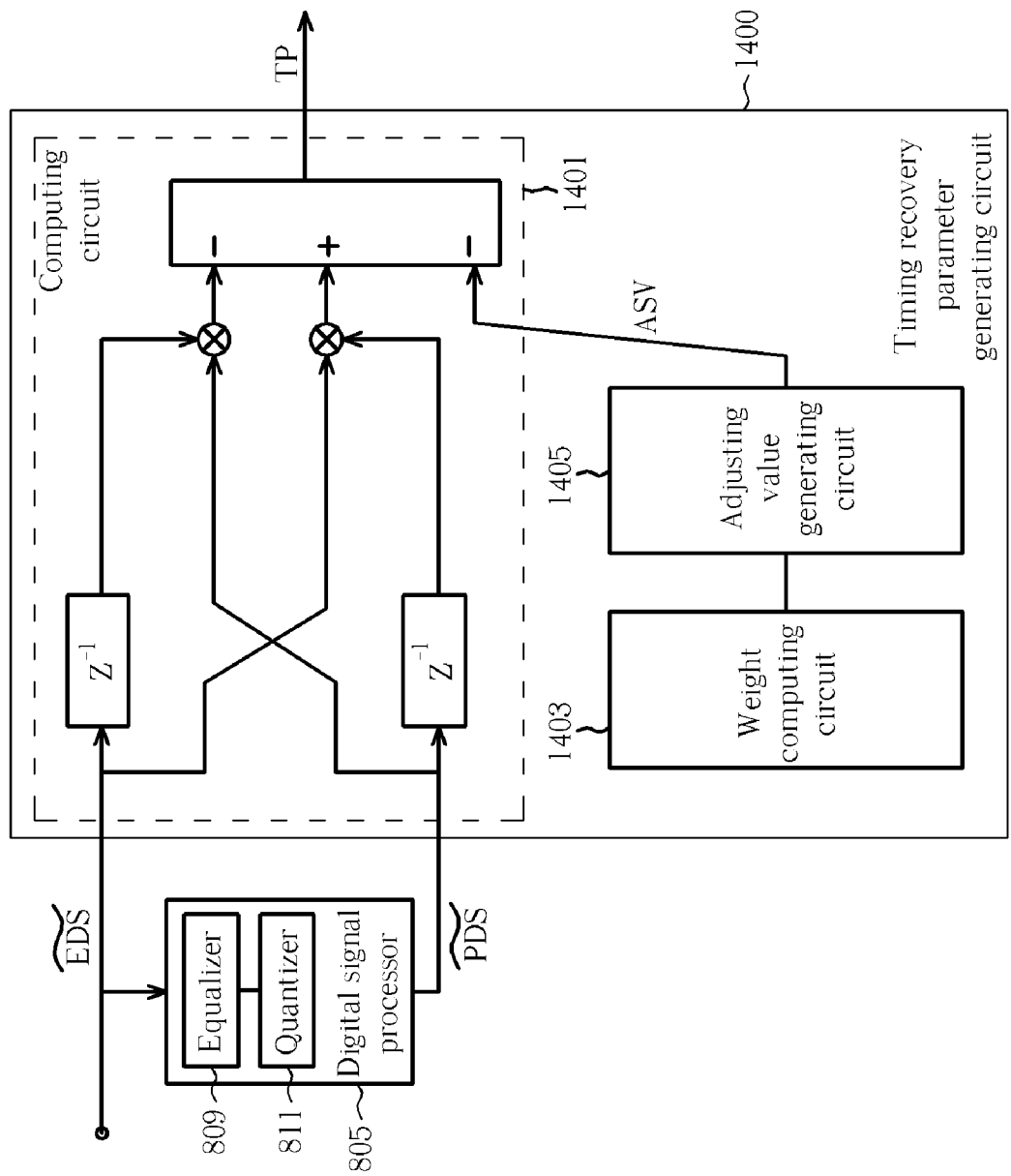
FIG. 14 is a circuit diagram illustrating a timing recovery parameter generating circuit according to a second embodiment of the present invention.

FIGS. 11~13 are schematic diagrams illustrating the relations between sampling points and weight values. FIG. 14 is a circuit diagram illustrating a timing recovery parameter generating circuit 1400 according to a second embodiment of the present invention. The timing recovery circuit 1400 utilizes weight of the signal to adjust sampling points. As shown in FIGS. 11~13, the weight will respond to the shift phenomenon of the sampling points. As shown in FIG. 11, when the sampling point has left shift, it is apparent that weight Q at the right side is higher than weight P at the left side. As shown in FIG. 12, the shift point has no shift, thus weight M will have the same value as weight N. Similarly, for FIG. 13, the sampling point has right shift, thus weight at X is smaller then weight at Y.

As described above, if weight of a previous signal and a next signal are obtained, the direction of the sampling point shift can also be obtained. The timing recovery parameter generating circuit 1400 utilizes such a concept to adjust sampling points. As shown in FIG. 14, the timing recovery parameter generating circuit 1400 includes a computing circuit 1401, a weight computing circuit 1403 and an adjusting value generating circuit 1405. The computing circuit 1401, which utilizes a Mueller & Muller algorithm in this embodiment, is used for receiving the processed digital signal PDS and the digital signal DS, and for computing an initial timing recovery parameter according to the processed digital signal PDS and the digital signal DS. The weight computing circuit 1403, which is coupled to the computing circuit 1401, is used for computing a first weight value $W_1$ and a second weight value $W_2$ according to a previous signal and a next signal of the digital signal. The adjusting value generating circuit 1405, which is coupled to the computing circuit 1401, is used for generating an adjusting value ADV according to the first weight value $W_1$ and the second weight value $W_2$. The computing circuit 1401 adjusts the initial timing recovery parameter to generate the timing recovery parameter TP according to the adjusting value ADV. It should be noted that, although the weighting computing circuit 1403 is utilized to compute weight in FIG. 14, this does not mean to limit the scope of the present invention. Persons skilled in the art can easily utilize other methods to obtain desired weight values, which also falls within the scope of the present invention.

In this embodiment, the adjusting value generating circuit 1405 subtracts the second weight W2 from the first weight W1 to generate an adjusting value ADV, and the computing circuit 1201 subtracts the adjusting value ADV from the initial timing recovery parameter to generate the timing recovery parameter TP. If FIG. 13 is taken as an example, the weight at X is utilized as the first weight $W_1$, the weight at Y is utilized as the second weight $W_2$, then the adjusting value ADV is a negative value, i.e. the sampling point has left shift. If FIG. 11 is taken as an example, the weight at P is utilized as the first weight $W_1$, the weight at Q is utilized as the second weight $W_2$, then the adjusting value ADV is a positive value, i.e. the sampling point has right shift.

It should be noted that, although the computing circuit 1401 is based on a Mueller & Muller algorithm, other algorithms can also be utilized to compute the initial timing recovery parameter. Also, although the timing recovery parameter generating circuit 1400 is utilized by the signal receiving circuit 800 shown in FIG. 8, it can also be utilized for other circuits.

As described above, the signal receiving circuit 800 is utilized for finding correct sampling points (that is, the sampling phase), and the timing recovery parameter generating circuits 900 and 1400 shown in FIGS. 9 and 12 are utilized for supporting the signal receiving circuit 800 to find more accurate sampling points.

Those skilled in the art will readily observe that numerous modifications and alterations of the device and method may be made while retaining the teachings of the invention.

What is claimed is:

1. A signal receiving circuit, comprising:
   a sampler, for receiving an analog signal and for sampling the analog signal to generate a sampling signal according to a sampling clock;
   an ADC, coupled to the sampler, for transferring the sampling signal to a digital signal;
   an equalizer, coupled to the ADC, for equalizing the digital signal to generate an equalized digital signal;
   a quantizer, coupled to the equalizer, for quantizing the equalized digital signal to generate a processed digital signal; and
   a timing recovery circuit, directly coupled to an output terminal of the sampler and coupled to the equalizer, for adjusting timing of the sampling clock according to the processed digital signal and the digital signal, wherein the timing recovery circuit includes a timing recovery parameter generating circuit and a loop filter, and the timing recovery parameter generating circuit comprises:
      a computing circuit, coupled to the equalizer and the quantizer, for receiving the processed digital signal and the digital signal, and for computing an initial timing recovery parameter according to the processed digital signal and the digital signal;
      a candidate value generating circuit, for providing a plurality of candidate values; and
      a multiplexer, coupled between the computing circuit and the candidate value generating circuit, for selecting one of the candidate values as an adjusting value according to a selecting signal;
      wherein the computing circuit further adjusts timing of the sampling clock according to the adjusting value, wherein the candidate values respectively correspond to different transmitting lengths of the analog signal.

2. A signal receiving circuit, comprising:
   a sampler, for receiving an analog signal and for sampling the analog signal to generate a sampling signal according to a sampling clock;
   an ADC, coupled to the sampler, for transferring the sampling signal to a digital signal;
   an equalizer, coupled to the ADC, for equalizing the digital signal to generate an equalized digital signal;
   a quantizer, coupled to the equalizer, for quantizing the equalized digital signal to generate a processed digital signal; and
   a timing recovery circuit, directly coupled to an output terminal of the sampler and coupled to the equalizer, for adjusting timing of the sampling clock according to the processed digital signal and the digital signal, wherein the timing recovery circuit includes a timing recovery parameter generating circuit and a loop filter, and the timing recovery parameter generating circuit comprises:
      a computing circuit, coupled to the equalizer and the quantizer, for receiving the processed digital signal and the digital signal, and for computing an initial timing recovery parameter according to the processed digital signal and the digital signal;
      a candidate value generating circuit, for providing a plurality of candidate values; and
      a multiplexer, coupled between the computing circuit and the candidate value generating circuit, for selecting one of the candidate values as an adjusting value according to a selecting signal;
      wherein the computing circuit further adjusts timing of the sampling clock according to the adjusting value, wherein the selecting signal is utilized as an auto gain control signal for controlling gain of the signal receiving circuit.

3. A timing recovery parameter generating circuit, for estimating timing error of a sampling clock to generate a target timing recovery parameter, comprising:
   a digital signal processing circuit, for receiving a digital signal to generate a processed digital signal;
   a computing circuit, coupled to the digital signal processing circuit, for receiving the processed digital signal and the digital signal, and for computing an initial timing recovery parameter according to the processed digital signal and the digital signal;
   a candidate value generating circuit, for providing a plurality of candidate values; and
   a multiplexer, coupled between the computing circuit and the candidate value generating circuit, for selecting one of the candidate values as an adjusting value according to a selecting signal;
   wherein the computing circuit further generates the target timing recovery parameter according to the adjusting value and the initial timing recovery parameter; wherein the timing recovery parameter generating circuit of is utilized for a signal receiving circuit, where the signal receiving circuit is used for receiving an input signal, and the candidate values respectively correspond to different transmitting lengths of the input signal.

4. A timing recovery parameter generating circuit, for estimating timing error of a sampling clock to generate a target timing recovery parameter, comprising:
   a digital signal processing circuit, for receiving a digital signal to generate a processed digital signal;
   a computing circuit, coupled to the digital signal processing circuit, for receiving the processed digital signal and the digital signal, and for computing an initial timing recovery parameter according to the processed digital signal and the digital signal;
   a candidate value generating circuit, for providing a plurality of candidate values; and
   a multiplexer, coupled between the computing circuit and the candidate value generating circuit, for selecting one of the candidate values as an adjusting value according to a selecting signal;
   wherein the computing circuit further generates the target timing recovery parameter according to the adjusting value and the initial timing recovery parameter, where the timing recovery parameter generating circuit is utilized for a signal receiving circuit, and the selecting signal is utilized as an auto gain control signal for controlling gain of the signal receiving circuit.

5. A signal receiving circuit, comprising:
   a sampler, for receiving an analog signal and for sampling the analog signal to generate a sampling signal according to a sampling clock;
   an ADC, coupled to the sampler, for transferring the sampling signal to a digital signal;
   an equalizer, coupled to the ADC, for equalizing the digital signal to generate an equalized digital signal;
   a quantizer, coupled to the equalizer, for quantizing the equalized digital signal to generate a processed digital signal; and a timing recovery circuit, having a first input terminal directly coupled to an output terminal of the ADC and an input terminal of the equalizer, and having a second input terminal coupled to an output terminal of the quantizer, for adjusting timing of the sampling clock according to the processed digital signal and the digital signal;

wherein the timing recovery circuit utilizes a Mueller & Muller algorithm and includes a timing recovery parameter generating circuit and a loop filter, and the timing recovery parameter generating circuit comprises:

a computing circuit, coupled to the equalizer and the quantizer, for receiving the processed digital signal and the digital signal, and for computing an initial timing recovery parameter according to the processed digital signal and the digital signal;

a weight computing circuit, coupled to the computing circuit, for computing a first weight value and a second weight value according to a previous signal and a next signal of the digital signal; and an adjusting value generating circuit, coupled to the computing circuit, for generating an adjusting value according to the first weight value and the second weight value;

wherein the computing circuit adjusts timing of the sampling clock according to the adjusting value.

* * * * *